US009385359B2

(12) United States Patent
Fritz et al.

(10) Patent No.: US 9,385,359 B2
(45) Date of Patent: Jul. 5, 2016

(54) CELL CONNECTOR HAVING VOLTAGE TAPPING POINT COATED WITH CONTACTING MATERIAL

(71) Applicant: ElringKlinger AG, Dettingen (DE)

(72) Inventors: Wolfgang Fritz, Metzingen (DE); Jan Groshert, Dettingen (DE); Christoph Tamegger, Grafenberg (DE); Michael Kohnle, Huiben (DE); Mark Laderer, Grabenstetten (DE)

(73) Assignee: ElringKlinger AG, Dettingen (DE)

( * ) Notice: Subject to any disclaimer, the term of this patent is extended or adjusted under 35 U.S.C. 154(b) by 456 days.

(21) Appl. No.: 13/771,926

(22) Filed: Feb. 20, 2013

(65) Prior Publication Data

US 2013/0216895 A1 Aug. 22, 2013

(30) Foreign Application Priority Data

Feb. 21, 2012 (DE) .......................... 10 2012 202 623

(51) Int. Cl.
*H01M 2/20* (2006.01)
*H01M 2/30* (2006.01)
*H01R 12/59* (2011.01)
*H01R 13/03* (2006.01)
*H01R 43/16* (2006.01)

(52) U.S. Cl.
CPC ............. *H01M 2/202* (2013.01); *H01R 12/592* (2013.01); *H01R 13/03* (2013.01); *H01R 43/16* (2013.01); *Y10T 29/49224* (2015.01)

(58) Field of Classification Search
CPC ..... H01M 2/202; H01R 12/592; H01R 13/03; H01R 43/16; Y10T 29/49224
USPC ............................................. 429/158; 29/885
See application file for complete search history.

(56) References Cited

U.S. PATENT DOCUMENTS

| | | | |
|---|---|---|---|
| 4,802,862 A * | 2/1989 | Seidler ........................... 439/83 |
| 7,615,309 B2 | 11/2009 | Kim et al. | |
| 2010/0314157 A1* | 12/2010 | Schulte ...................... 174/126.2 |
| 2011/0097618 A1* | 4/2011 | Hauck et al. .................. 429/158 |
| 2012/0100761 A1 | 4/2012 | Große et al. | |

FOREIGN PATENT DOCUMENTS

DE 10 2010 022 689 A1 12/2011
DE 10 2010 023 934 A1 12/2011

OTHER PUBLICATIONS

Coaxial. Dictionary.com. Dictionary.com Unabridged. Random House, Inc. http://dictionary.reference.com/browse/coaxial (accessed: Feb. 26, 2015).*

* cited by examiner

*Primary Examiner* — Sean P Cullen
(74) *Attorney, Agent, or Firm* — Womble Carlyle Sandridge & Rice LLP

(57) ABSTRACT

A cell connector is provided by means of which an electrically conductive connection between a voltage tapping point and a voltage tapping line can be established, wherein the cell connector is for the connection of a first cell terminal of a first electro-chemical cell and a second cell terminal of a second electro-chemical cell and includes a voltage tapping point with a contact element for connection to a terminal element of a voltage tapping line and also a longitudinal axis and a peripheral wall extending about the longitudinal axis. The contact element includes a base material, which is at least partially pre-coated with a contacting material in an initial state, and reshaped from the initial state into a final state such that the proportion of the peripheral wall coated with the contacting material to the overall peripheral angular extent of the peripheral wall amounts to more than 50%.

13 Claims, 19 Drawing Sheets

CELL CONNECTOR HAVING VOLTAGE TAPPING POINT COATED WITH CONTACTING MATERIAL

CROSS REFERENCE TO RELATED APPLICATION

The present disclosure claims priority from, and the benefit under 35 U.S.C. §119, of German Patent Application No. 10 2012 202 623.1, filed Feb. 21, 2012, the entire specification of which is incorporated herein by reference.

FIELD OF DISCLOSURE

The present invention relates to a cell connector for the electrically conductive connection of a first cell terminal of a first electro-chemical cell to a second cell terminal of a second electro-chemical cell, wherein the cell connector comprises a voltage tapping point having a contact element for electrically conductive connection to a terminal element of a voltage tapping line and wherein the contact element comprises a longitudinal axis and a peripheral wall extending around the longitudinal axis.

Such electro-chemical devices can be in the form of electrical accumulators, particularly in the form of lithium ion accumulators for example.

BACKGROUND OF THE INVENTION

In the case of a lithium ion accumulator, the voltage difference between the two cell terminals (poles) of an individual accumulator cell amounts to approximately 3.6 V. In order to obtain the requisite higher voltage level of e.g. approximately 360 V that is needed for many applications such as in the field of automobile propulsion for example, many such accumulator cells (approximately 100 for example) have to be connected electrically in series.

In connection therewith, the accumulator cells or, more generally, the electro-chemical cells can be combined into modules each of which contains a plurality of such electro-chemical cells, wherein the direction in which the mutually neighboring cells are installed alternates so that positive and negative cell terminals are located next to each other in alternating manner. These mutually neighboring cell terminals of opposite polarity are interconnected directly by means of a cell connector for producing the series connection of the cells.

The voltage tapping point incorporating the contact element connected to a base body of the cell connector serves to provide a reliable, operationally secure, low contact resistance connection of the cell connector to a voltage tapping line which itself is connected to an evaluating device of the electro-chemical device.

Differences in electrical potential between the various cell connectors are measured by the evaluating device in order to facilitate monitoring of each individual cell in the electro-chemical device.

SUMMARY OF THE INVENTION

The object of the present invention is to enable the electrically conductive connection between the voltage tapping point and the voltage tapping line to be produced in a particularly simple and reliable manner.

In accordance with the invention, this object is achieved in the case of a cell connector incorporating the features indicated in the first part of claim 1 in that the contact element comprises a base material which is at least partially pre-coated with a contacting material in an initial state and is reshaped from the initial state into a final state in such a manner that the proportion of the part of the peripheral wall that is coated with the contacting material amounts to more than 50% of the overall peripheral angular extent of the peripheral wall.

Due to the construction of the contact element in accordance with the invention, it is possible to produce a reliable, electrically conductive solder joint between the contact element of the voltage tapping point and the terminal element of the voltage tapping line even if the base material of the contact element is non-solderable or can only be soldered with difficulty.

Aluminum or aluminum alloys in particular cannot be soldered without special measures and in particular, without a pre-coating, because of the oxide coating that is always present on the surface thereof.

Cell connectors however are frequently manufactured from an aluminum-containing material in order to enable the cell connector to be connected to a likewise aluminum-containing cell terminal uniformly by means of a substance-to-substance bond.

In order to obtain a solderable surface in the case of a contact element consisting of an intrinsically non-solderable base material, the base material is pre-coated with a solderable contacting material.

In connection therewith, in the region from which the contact element is formed, the base material may be only partially pre-coated with the contacting material or it could be pre-coated over substantially the whole of its surface area.

In particular, a partial pre-coating can be applied to the base material in the form of strips.

In the case of an only partially pre-coated base material, provision may be made in particular for at least one contact region at which the cell connector is connected to a cell terminal in the assembled state, to remain free of the pre-coating incorporating the contacting material so that a cell connector consisting of a material matching the material of the cell terminal can be connected, by welding for example, uniformly to the cell terminal.

In the case of contact elements punched out from a starting material, it is normally necessary to also apply a coating incorporating a contacting material to the punched edges in an additional processing step in order to obtain a sufficiently large solderable surface on the contact element.

Thus, for example, the cross section of a square soldering pin having a material thickness of 1 mm and a width of 1 mm has a 50% portion of rolled sheet metal surface and another 50% portion consisting of a punched edge. If, here, one makes use of a pre-coated tape-like material, this then results in the proportion of coated surface being just 50%. However, in order to ensure secure soldering of the surface of the soldering pin, such a proportion of coated surface is not sufficient; it would therefore be necessary to coat the entire surface area of such a pin in an additional processing step.

Due to the solution in accordance with the invention, such a complex and expensive additional processing step is saved.

Namely, in accordance with the invention, the base material that is pre-coated with a contacting material in an initial state thereof is reshaped from the initial state into a final state in such a manner that the proportion of the part of the peripheral wall of the contact element that is coated with the contacting material to the overall peripheral angular extent of the peripheral wall amounts to more than 50%.

Consequently, due to the enlargement of the proportion of the part of the peripheral wall that is coated with the contacting material and is therefore solderable to the peripheral angular extent of the contact element, one obtains the effect that the contact element is solderable, and in particular, that it is solderable to a terminal element of a voltage tapping line on a printed circuit board without an additional coating step being required for this purpose.

In a preferred embodiment of the invention, the pre-coated base material is reshaped in such a manner that, in the final state, the proportion of the part of the peripheral wall that is coated with the contacting material to the overall peripheral angular extent of the peripheral wall amounts to more than 60%, and preferably, to more than 75%.

For the purposes of obtaining a secure connection between the contact element and the terminal element, it is particularly expedient if, in the final state, the peripheral wall of the contact element is coated with the contacting material over a peripheral angular extent of at least approximately 270°, preferably of at least approximately 300°.

In connection therewith, the peripheral angular extent is taken with reference to the longitudinal axis of the contact element.

In special embodiments of the cell connector in accordance with the invention, the contact element is formed such as to be substantially rotationally symmetrical with respect to the longitudinal axis.

The contact element can, for example, be in the form of a pin which is coated with the contacting material on the outer periphery thereof.

As an alternative thereto, provision may also be made for the contact element to be in the form of a sleeve which is coated with the contacting material on the inner periphery thereof and/or on the outer periphery thereof.

The contact element can, for example, be reshaped from the initial state into the final state by a rolling process, by a deep-drawing process and/or by a stamping process.

In a preferred embodiment of the invention, provision may be made for the base material of the contact element to comprise aluminum.

It is particularly expedient if aluminum forms the main component of the base material, i.e. that component which comprises the highest part by weight of the base material.

Preferably, the base material is aluminum or an aluminum alloy.

The contacting material is electrically conductive and preferably a metallic material.

Preferably, the contacting material comprises nickel, silver, gold, copper and/or tin.

It is particularly expedient, if nickel, silver, gold, copper or tin form the main component of the contacting material, i.e. that component comprising the highest part by weight of the contacting material.

In particular, provision may be made for the contacting material to be a nickel alloy, a silver alloy, a gold alloy, a copper alloy or a tin alloy.

The contact element may comprise at least one free separation edge, in particular a free punched edge or a free cut edge, that is not coated with the contacting material.

In accordance with the invention, the proportion of the free separation edge that is not coated with the contacting material to the overall peripheral angular extent of the peripheral wall is less than 50%, preferably less than 40%, and in particular, less than 25%.

It is particularly expedient, if, in the final state of the contact element, at least one peripheral wall of the contact element is coated with the contacting material to at least 50%, preferably to at least 60%, in particular to at least 75%, and most preferably, substantially completely.

The cell connector in accordance with the invention is suitable in particular for use in a combination of such a cell connector and a terminal element of a voltage tapping line of an electro-chemical device, wherein the contact element of the cell connector is connected to the terminal element by means of a substance-to-substance bond.

In connection therewith, the contact element can be soldered in particular to the terminal element.

Furthermore, provision may be made for the terminal element to comprise a passage opening with an axial direction, wherein the longitudinal axis of the contact element is oriented such as to be substantially coaxial with the axial direction of the passage opening.

The electro-chemical device in which the cell connector is employed, can, in particular, be in the form of an accumulator, a lithium ion accumulator for example.

If the electro-chemical device in accordance with the invention is in the form of an accumulator, then it is suitable in particular as a high capacity energy source for motor vehicle drives for example.

Furthermore, the present invention relates to a method of manufacturing a cell connector for connecting a first cell terminal of a first electro-chemical cell and a second cell terminal of a second electro-chemical cell in electrically conductive manner, wherein the cell connector comprises a voltage tapping point having a contact element for the electrically conductive connection thereof to a terminal element of a voltage tapping line.

The further object of the present invention is to provide such a method by means of which there is manufactured a cell connector, the contact element of which is connectable electrically in highly conductive manner to the terminal element of the voltage tapping line in a particularly simple manner.

In accordance with the invention, this object is achieved by a method for manufacturing a cell connector which comprises the following processing steps:

providing a base material which is at least partially pre-coated with a contacting material;

separating out a cell connector pre-form from the pre-coated base material;

reshaping the cell connector pre-form in such a way that a contact element is formed which, in the final state after the reshaping process, has a longitudinal axis and a peripheral wall extending over a peripheral angular extent about the longitudinal axis, wherein, in the final state, the proportion of the part of the peripheral wall that is coated with the contacting material to the overall peripheral angular extent of the peripheral wall amounts to more than 50%, preferably more than 60%, and in particular, to more than 75%.

In particular, provision may be made for the proportion of the part of the peripheral wall that is coated with the contacting material to the overall peripheral angular extent of the peripheral wall to amount to substantially 100% in the final state.

The method in accordance with the invention for manufacturing a cell connector can, in particular, form a part of a method of producing an electrically conductive connection between the cell connector and a terminal element of a voltage tapping line of an electro-chemical device which comprises the following additional processing step:

connecting the contact element of the cell connector to the terminal element by a substance-to-substance bond, in particular by soldering.

Particular embodiments of the method in accordance with the invention have already been described hereinabove in the context of the cell connector in accordance with the invention.

The concept underlying the present invention is that, for the purposes of forming the contact element, use is made of a pre-coated base material and this is then reshaped, in particular, by processes integrated into a follow-on tool, such as rolling, stamping or deep-drawing for example, in such a manner that a contact element having a sufficiently large, coated surface thereby results.

The enlargement of the peripheral angular extent of the solderable surface of the contact element can, for example, be effected by a cold-flow beveling process, by rolling a pin or by deep-drawing a soldering land, an eyelet or a bowl.

Due to this reshaping process, a pre-coated base material, a strip-coated aluminum material for example, can be employed and soldered without involving further coating processes thereby producing significant savings in materials and work.

Further features and advantages of the invention form the subject matter of the following description and the graphical illustration of exemplary embodiments.

BRIEF DESCRIPTION OF THE DRAWINGS

Similar or functionally equivalent elements are provided with the same reference symbols in each of the Figures.

DETAILED DESCRIPTION OF THE INVENTION

Figure 1:
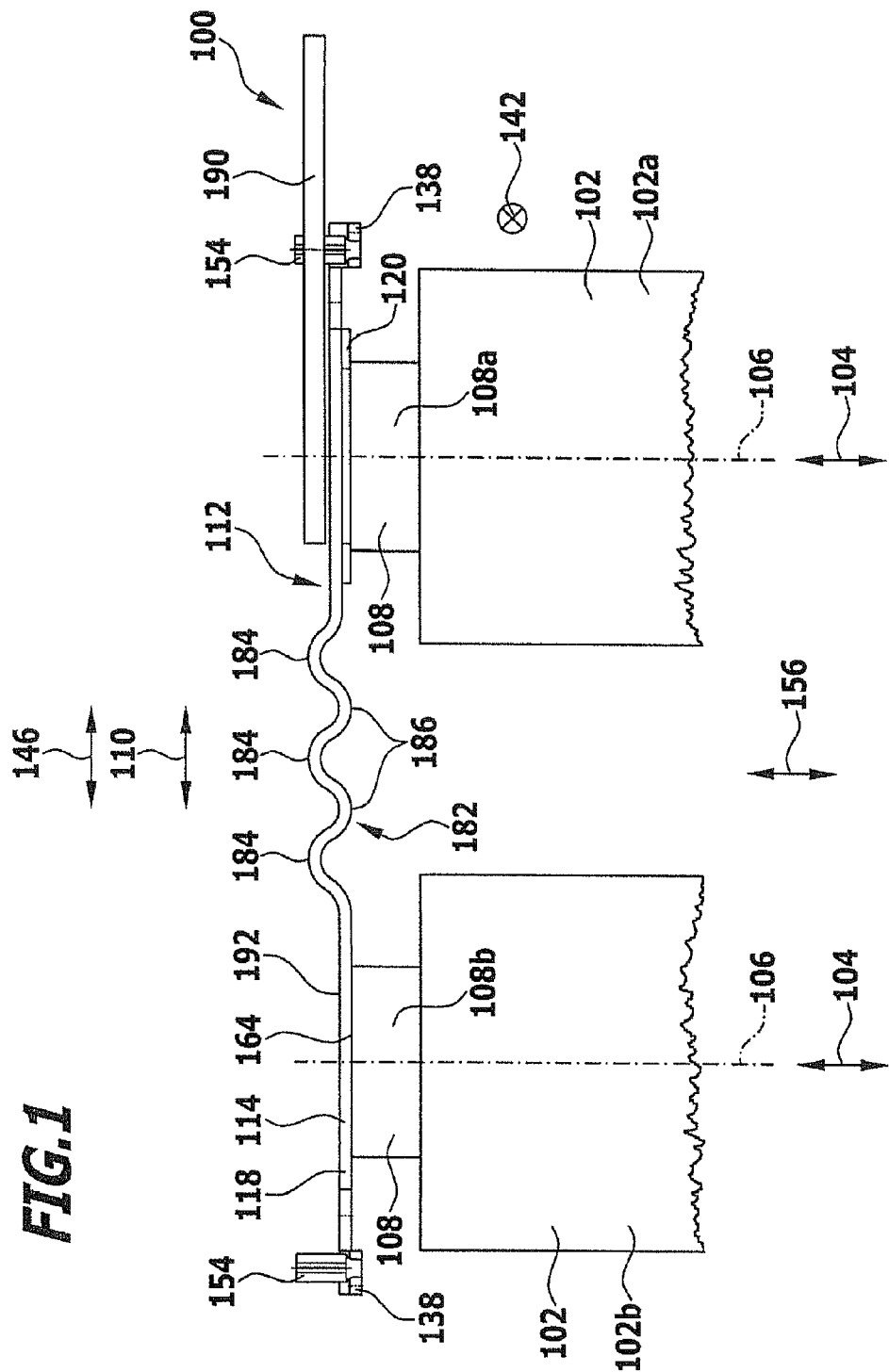
FIG. 1 shows a schematic side view of a cell connector and two electro-chemical cells in which the cell terminals thereof are connected together by means of the cell connector.
Figure 2:
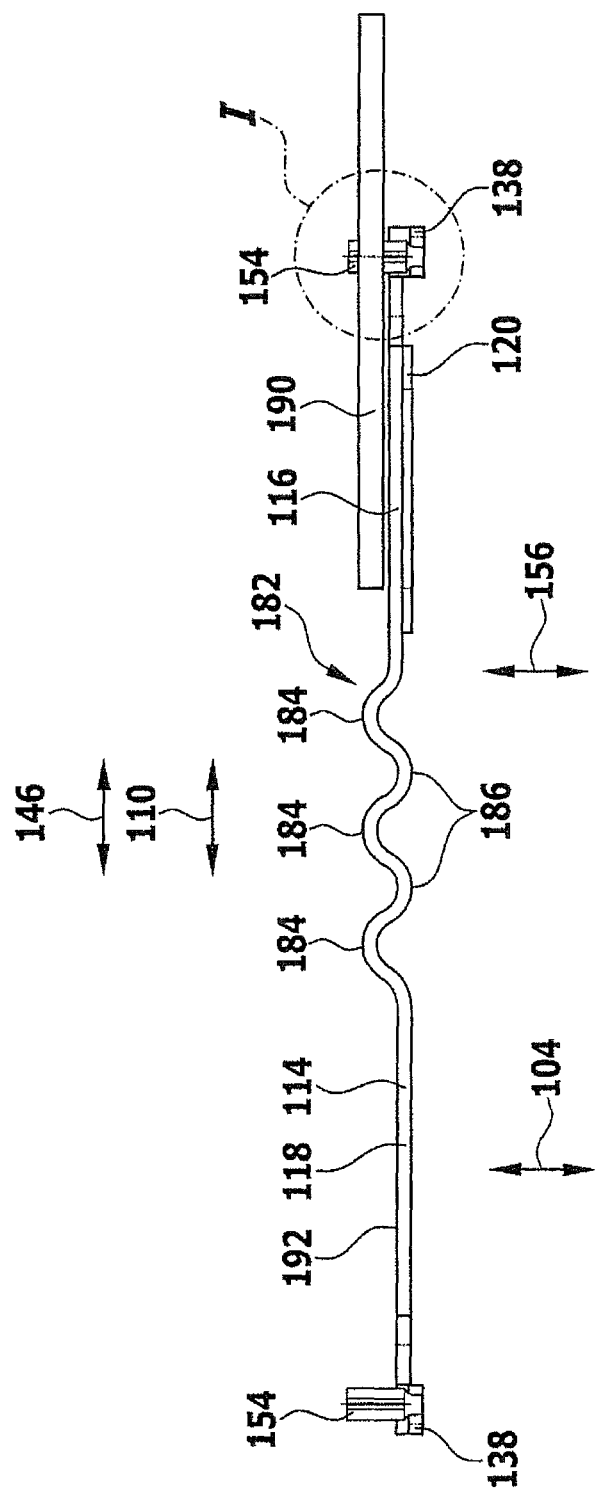
FIG. 2 shows a schematic side view of the cell connector depicted in FIG. 1, without the electro-chemical cells being connected together by the cell connector.

An electro-chemical device designated as a whole by 100 comprises, for example, a plurality of (not illustrated) electro-chemical modules each of which comprises a plurality, eight or twelve in each for example, electro-chemical cells 102 which are each accommodated in a seating of a (not illustrated) holding device of the module.

In particular, such a holding device can be in the form of a heat sink which is in heat conducting contact with the electro-chemical cells accommodated therein in order to extract the heat produced by the electro-chemical cells 102 when the electro-chemical device 100 is in operation.

The electro-chemical cells 102 are arranged and oriented in the surrounding holding device in such a manner that the axial directions 104 of the electro-chemical cells 102, which extend in parallel with the central longitudinal axes 106 of the electro-chemical cells 102, are oriented such as to be substantially parallel to each other.

Thereby, each of the electro-chemical cells 102 extends in the respective axial direction 104 from a front cell terminal 108 up to a (not illustrated) rear cell terminal, each of the cell terminals forming a positive pole or a negative pole of the respective electro-chemical cell 102.

The central longitudinal axes 106 of the electro-chemical cells 102 are thereby simultaneously central longitudinal axes of the cell terminals 108 of the respective electro-chemical cells 102.

Within a module, the mutually neighboring electro-chemical cells 102 are oriented relative to each other in such a manner that the cell terminals of two neighboring cells 102*a*, 102*b* arranged on the same side of the module exhibit mutually opposite polarities.

Thus, for example, in the cell assembly illustrated in FIG. 1, the front cell terminal 108*a* of the electro-chemical cell 102*a* forms a negative pole of the corresponding electro-chemical cell 102*a*, whilst the front cell terminal 108*b* of the electro-chemical cell 102*b* neighboring thereon in the connecting direction 110 of the electro-chemical cell 102*a* forms a positive pole of the electro-chemical cell 102*b*.

The electro-chemical device 100 can, in particular, be in the form of an accumulator, preferably, a lithium ion accumulator of the type LiFePO$_4$ for example.

In correspondence therewith, the electro-chemical cells 102 of the electro-chemical modules can be in the form of accumulator cells, and in particular, in the form of lithium ion accumulator cells of the type LiFePO$_4$ for example.

Furthermore, each electro-chemical module comprises a plurality of cell connectors 112 by means of which the cell terminals 108 of mutually neighboring electro-chemical cells 102 of different polarity are connected to one another in an electrically conductive manner in order to connect all of the electro-chemical cells 102 of an electro-chemical module electrically in series in this manner.

Hereby, each cell connector 112 connects a first cell terminal 108a of negative polarity to a second cell terminal 108b of positive polarity of a neighboring electro-chemical cell 102.

In order to connect all the electro-chemical cells 102 of a module electrically in series, then, apart from the front cell terminals 108 of mutually neighboring electro-chemical cells, the rear cell terminals of mutually neighboring electro-chemical cells of a module are also connected to one another by (not illustrated) cell connectors.

Each of the cell connectors 112 which respectively interconnects a first cell terminal 108a and a second cell terminal 108b in electrically conductive manner comprises a base body 114 having a first contact region 116 which, in the assembled state of the cell connector 112, is arranged such that it neighbors a first (negative for example) cell terminal 108a of an electro-chemical cell 102a, and a second contact region 118 which, in the assembled state of the cell connector 112, is connected to a second (positive for example) cell terminal 108b of another electro-chemical cell 102b.

The base body 114 of the cell connector 112 is preferably in the form of a stamped and bent part.

The base body 114 may be single-layered or multi-layered.

In a multi-layer implementation, a plurality of layers of the base body 114 can be integrated with one another. As an alternative or in addition thereto, provision may also be made for the plurality of layers of the base body to be manufactured separately from each other and to be connected to one another during the process of assembling the cell connector, in particular, by means of a substance-to-substance bond.

Furthermore, the cell connector 112 may comprise a contact body 120 which is manufactured separately from the base body 114 and is fixed to the side of the base body 114 facing the cell terminals 108 in the region of the first contact section 116, preferably, by means of a substance-to-substance bond.

In particular, the contact body 120 can be connected to the base body 114 of the cell connector 112 by welding, by ultrasonic welding for example, by soldering and/or by adhesion.

The contact body 120 is preferably in the form of a stamped part.

In the assembled state of the cell connector 112, the contact body 120 is connected to a jointing area of the base body 114 facing the contact body 120 and, in the assembled state of the electro-chemical device 100, it is connected to one of the cell terminals 108, to the negative first cell terminal 108a for example, by means of a substance-to-substance bond.

In particular, provision may be made for the contact body 120 to be connected to the cell terminal 108a by welding, and in particular, by laser welding.

As an alternative thereto however, provision could also be made for the cell connector 112 not to comprise a contact body 120, but rather, for the base body 114 to be connected directly to both cell terminals 108a, 108b, especially by being welded thereto. This can be the case, in particular, where both cell terminals 108a, 108b are formed from a material that can be readily connected to the material of the base body 114.

Furthermore, the base body 114 of the cell connector 112 comprises two voltage tapping points 138, for example in the form of web members, which are formed in one piece manner with a respective one of the contact regions 116 or 118 and extend away therefrom.

In particular, provision may be made for the web-formed voltage tapping point 138 to comprise an initial section 140 which is connected to the respectively associated contact region 116 or 118 and which, for example, extends substantially in parallel with a longitudinal direction 146 of the cell connector 112 and comprises an end section 148 that follows onto the initial section 140 and extends substantially parallel to the transverse direction 142 of the cell connector 112 for example.

The transverse direction 142 and the longitudinal direction 146 of the cell connector 112 run perpendicularly to each other.

Hereby, the initial section 140 of the voltage tapping point 138 is preferably connected to the end section 148 of the voltage tapping point 138 by means of a curved intermediate section 150.

The free end of the end section 148 of the voltage tapping point 138 is provided with a contact element 154 for the purposes of attaching the voltage tapping point 138 to a terminal element 188 of a voltage tapping line of the electro-chemical device 100 on a printed circuit board 190.

In order to enable the position of the contact element 154 to be altered in a desired manner i.e. its positioning in a contact direction 156 of the cell connector 112 perpendicular to the transverse direction 142 and to the longitudinal direction 146 relative to the position of the contact regions 116 and 118, the voltage tapping point 138, and in particular the end section 148 thereof, can be provided with an off-set portion 158.

The off-set portion 158 preferably extends substantially transversely, and in particular, substantially perpendicularly with respect to a longitudinal direction of the end section 148.

Basically, in the assembled state of the electro-chemical device 100, the off-set part 160 of the voltage tapping point 138 can be displaced with respect to the contact region 122, towards the cell terminal 108a or away from the cell terminal 108a.

In the embodiment illustrated in the drawings, the off-set part 160 of the voltage tapping point 138 is displaced with respect to the contact regions 116 and 118, towards the cell terminal 108a.

The average thickness of the material of the voltage tapping point 138 is preferably substantially the same as that of the base body 114.

The one-piece contact body 120 preferably consists of a material that is different from the material of the base body 114 and it is preferably formed substantially entirely from a material that is different from the material of the base body 114.

In particular, provision may be made for the contact body 120 to be made of nickel or a nickel alloy.

In operation of the electro-chemical device 100, a difference between the longitudinal expansion of the cell connectors 112 on the one hand and a change in the spacing between the longitudinal axes 106 of the cell terminals 108a, 108b that are connected together by the cell connectors 112 on the other can occur due to differing temperatures and/or due to differing thermal coefficients of expansion of the cell connectors 112 on the one hand and of the holding device for the electro-chemical cells 102 on the other. As a result of a change in temperature, the relative positions of the cell terminals 108a, 108b interconnected by a cell connector 112 will alter in the connecting direction 110 which is oriented perpendicularly with respect to the axial direction 104 of the electro-chemical cells 102.

Figure 3:
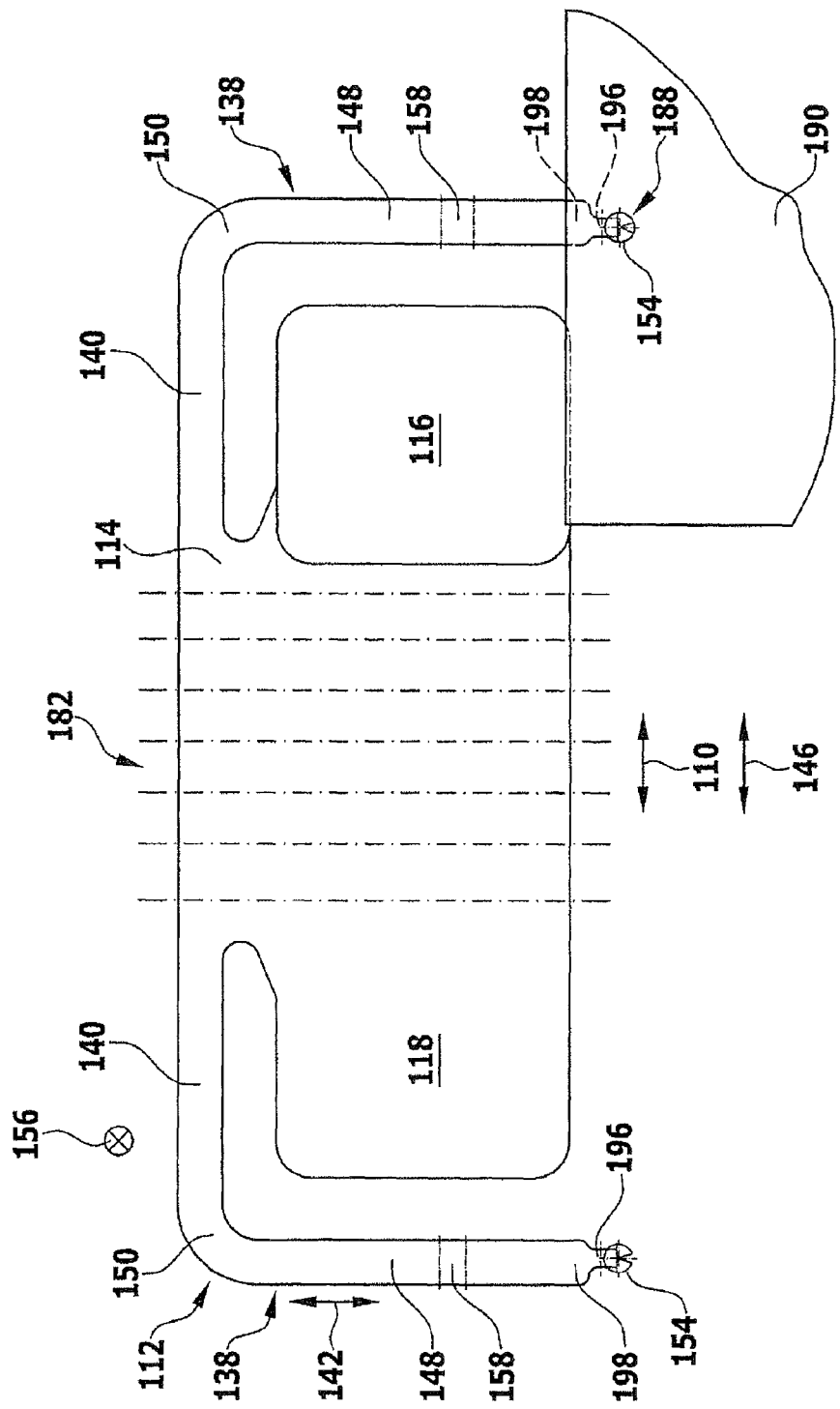
FIG. 3 shows a schematic plan view from above of the cell connector depicted in FIGS. 1 and 2 and a printed circuit board to which a voltage tapping point of the cell connector is connected.

The connecting direction 110 is located in a plane 180 which contains the longitudinal axes 106 of the electro-chemical cells 102a and 102b (see FIG. 3).

Furthermore, due to differing longitudinal expansions of the electro-chemical cells 102a, 102b that are connected together by a cell connector 112, there may occur a change in the relative positions between the interconnected cell terminals 108a, 108b along the axial direction 104 of the mutually interconnected electro-chemical cells 102a, 102b.

In order to compensate for such differences between the longitudinal expansion of the cell connector 112 on the one hand and a change in the spacing between the longitudinal axes 106 of the cell terminals 108a, 108b connected together by the cell connector 112 on the other and/or for such differences between the longitudinal expansions of a first electro-chemical cell 102a and a second electro-chemical cell 102b which are connected together by the cell connector 112, provision may be made for the cell connector 112 to comprise a resiliently and/or plastically deformable compensation region 182 which is arranged between the first contact region 122 and the second contact region 166 of the cell connector 112 and which connects the two contact regions 122 and 166 together.

Preferably, the base body 114 of the cell connector 112 is provided with such a compensation region 182.

In the embodiment of a cell connector 112 illustrated in the Figures, the deformable compensation region 182 has a wave-like structure, wherein the wave-like structure comprises one or more e.g. three undulations having an amplitude which is directed in parallel with the axial direction 104 of the cells 102a, 102b that are to be interconnected by the cell connector 112 and substantially perpendicularly relative to the respective contact areas at which the cell connector 112 abuts the first cell terminal 108a and the second cell terminal 108b in the assembled state. These undulations comprise a plurality, e.g. three wave peaks 184 which run transversely, preferably substantially perpendicularly, to the axial direction 104 of the electro-chemical cells 102 and transversely, preferably substantially perpendicularly, to the longitudinal direction 146 of the cell connector 112 and substantially parallel to the transverse direction 142 of the cell connector 112, and also a plurality of wave troughs 186 which are arranged between the wave peaks 184 and run transversely, preferably substantially perpendicularly, to the axial direction 104 of the electro-chemical cells 102 and transversely, preferably substantially perpendicularly, to the longitudinal direction 146 of the cell connector 112 and substantially parallel to the transverse direction 142 of the cell connector 112.

In the assembled state of the electro-chemical device 100, the longitudinal direction 146 of the cell connector 112 extends substantially in parallel with the connecting direction 110, and the transverse direction 142 of the cell connector 112 extends substantially perpendicularly with respect to the connecting direction 110.

The wave peaks 184 project upwardly in the contact direction 156 of the cell connector 112 which is perpendicular to the contact areas of the cell connector 112 and coincides with the axial direction 104 of the electro-chemical cells 102 in the assembled state of the electro-chemical device 100, whilst the wave troughs 186 project downwardly in the contact direction 156 (i.e. towards the cells 102 that are to be connected together).

Due to the wave-like structure of the deformable compensation region 124 of the cell connector 112, the effect is achieved that the compensation region 124 is resiliently and/or plastically deformable in simple manner in such a way that the second contact region 118 can be displaced relative to the first contact region 116 in both the axial direction 104 of the electro-chemical cells 102 as well as in the longitudinal direction 146 of the cell connector 112 in order to compensate for the previously described differences in the relative positions of the cell terminals 108a and 108b that are to be connected together by the cell connector 112. This can thereby prevent the occurrence of excessive mechanical stresses at the junction points between the cell connector 112 on the one hand and the first cell terminal 108a and also the second cell terminal 108b on the other.

The base body 114 of the cell connector 112 is formed from an electrically conductive metallic material consisting of aluminum or an aluminum alloy for example.

Likewise, a contact area 164 of the second cell terminal 108b, at which the second cell terminal 108b is connected to the base body 114 of the cell connector 112 by means of a substance-to-substance bond, is preferably formed from aluminum or an aluminum alloy so that a uniform substance-to-substance connection is obtained between the second cell terminal 108b and the base body 114 of the cell connector 112.

Aluminum or an aluminum alloy has an oxide coating so that this material cannot be soldered without a pre-coating.

In consequence, the upper surface 192 of the base body 114 which is remote from the cell terminals 108a and 108b in the assembled state is provided with a coating consisting of a contacting material.

The contacting material is an electrically conductive material.

Preferably, the contacting material is a metallic material.

In particular, provision may be made for the contacting material to comprise nickel, silver, gold, copper and/or tin.

Provision may be made in particular for the contacting material to be a nickel alloy, a silver alloy, a gold alloy, a copper alloy or a tin alloy.

Nickel, silver, gold, copper or tin preferably form the main component of the contacting material, i.e. the component which exhibits the highest part by weight of the contacting material.

The coating 194 consisting of the contacting material extends over at least a part of the upper surface 192 of the base body, and in particular, over at least a part of the upper surface of the voltage tapping point 138. The coating 194 of contacting material preferably extends over substantially the entire upper surface 192 of the base body 114 and in particular too, over the entire upper surface of the voltage tapping point 138.

Figure 4:
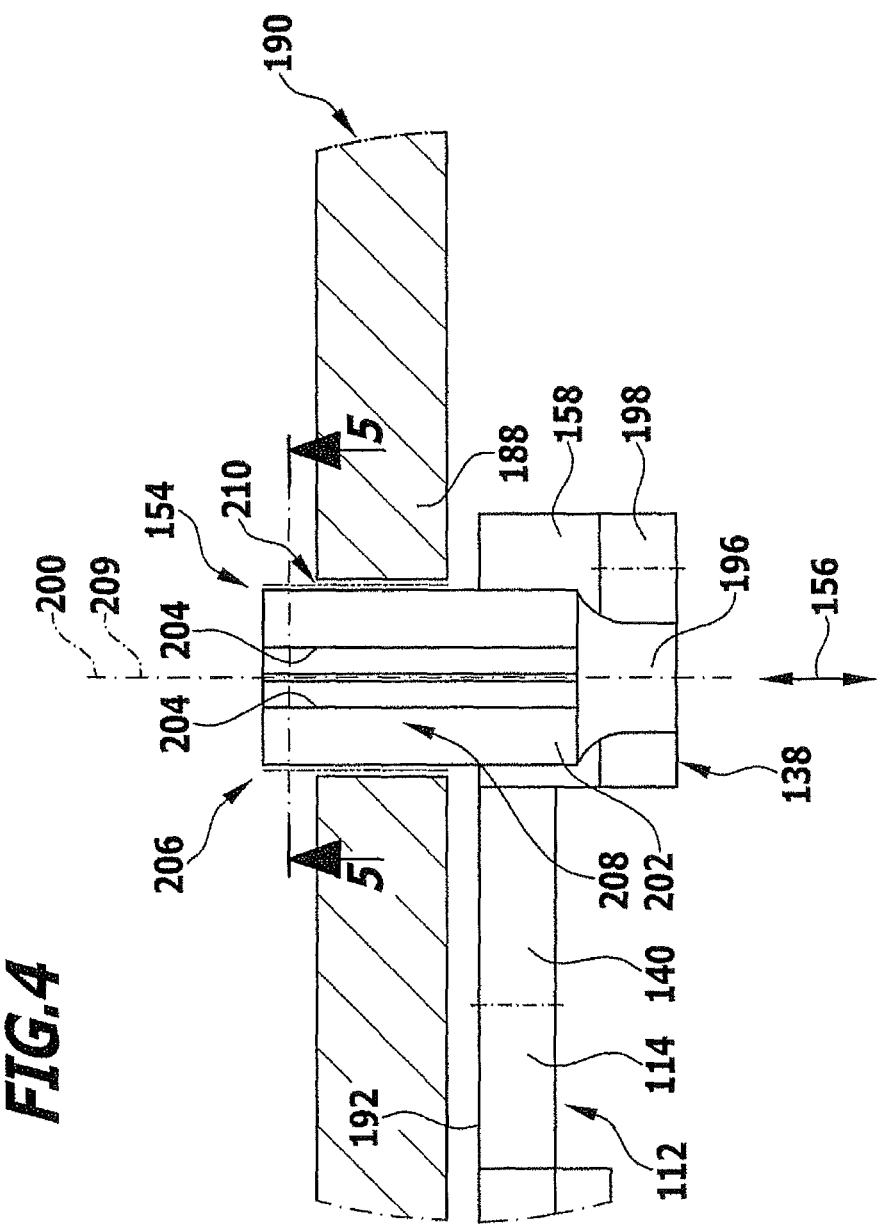
FIG. 4 shows an enlarged, partially sectional view of the region I depicted in FIG. 2.

The contact element 154 is connected in one piece manner to an end region 198 of the end section 148 of the voltage tapping point 138 by a web member 196 which is bent at an angular extent of approximately 90° and extends along a longitudinal axis 200 that is substantially parallel to the contact direction 156 of the cell connector 112 (see especially FIG. 4).

Figure 5:
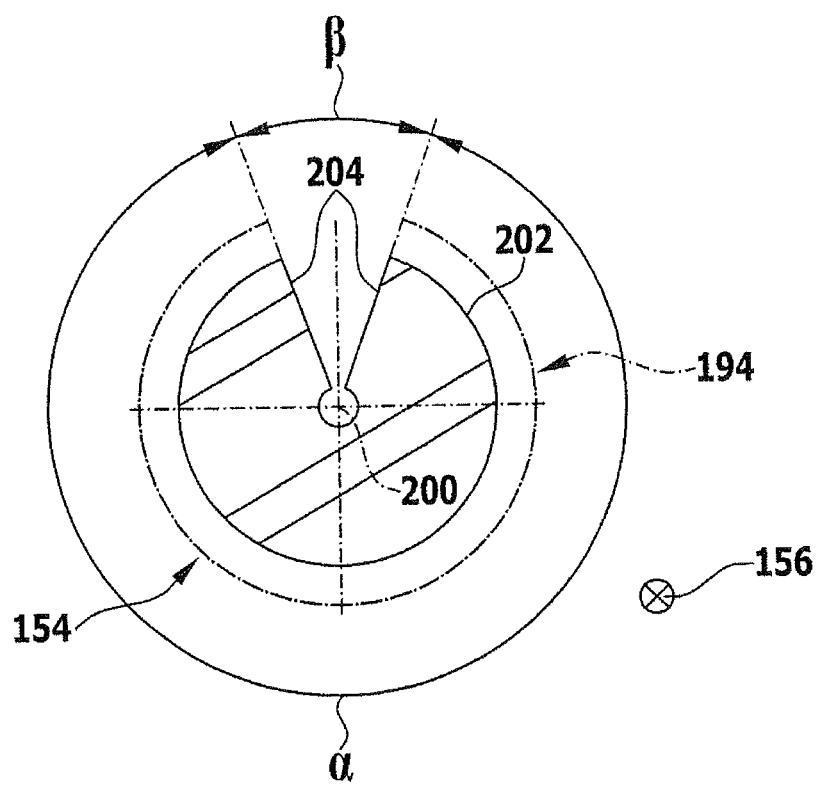
FIG. 5 shows a schematic cross section through a contact element of the voltage tapping point, along the line 5-5 in FIG. 4.
Figure 6:
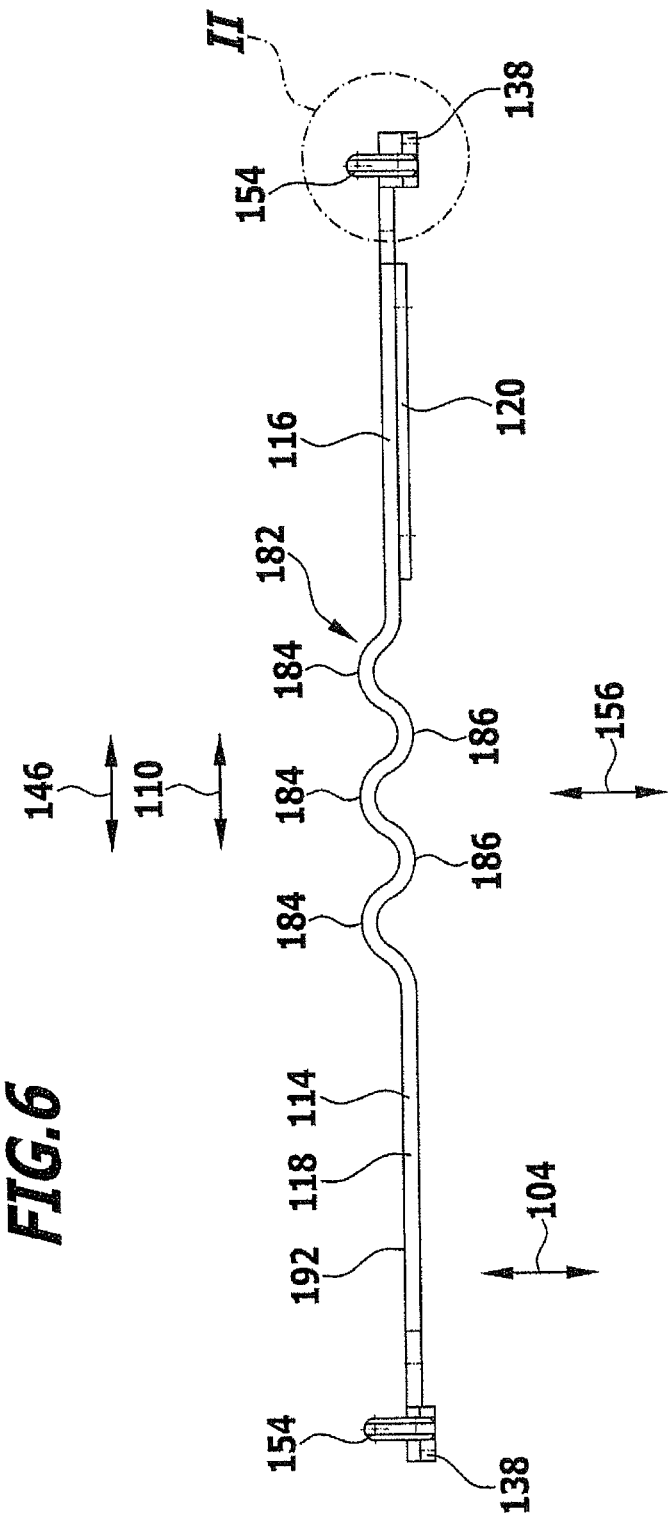
FIG. 6 shows a schematic side view of a second embodiment of a cell connector having a contact element which comprises bevels produced by a cold-flow pressing process.
Figure 7:
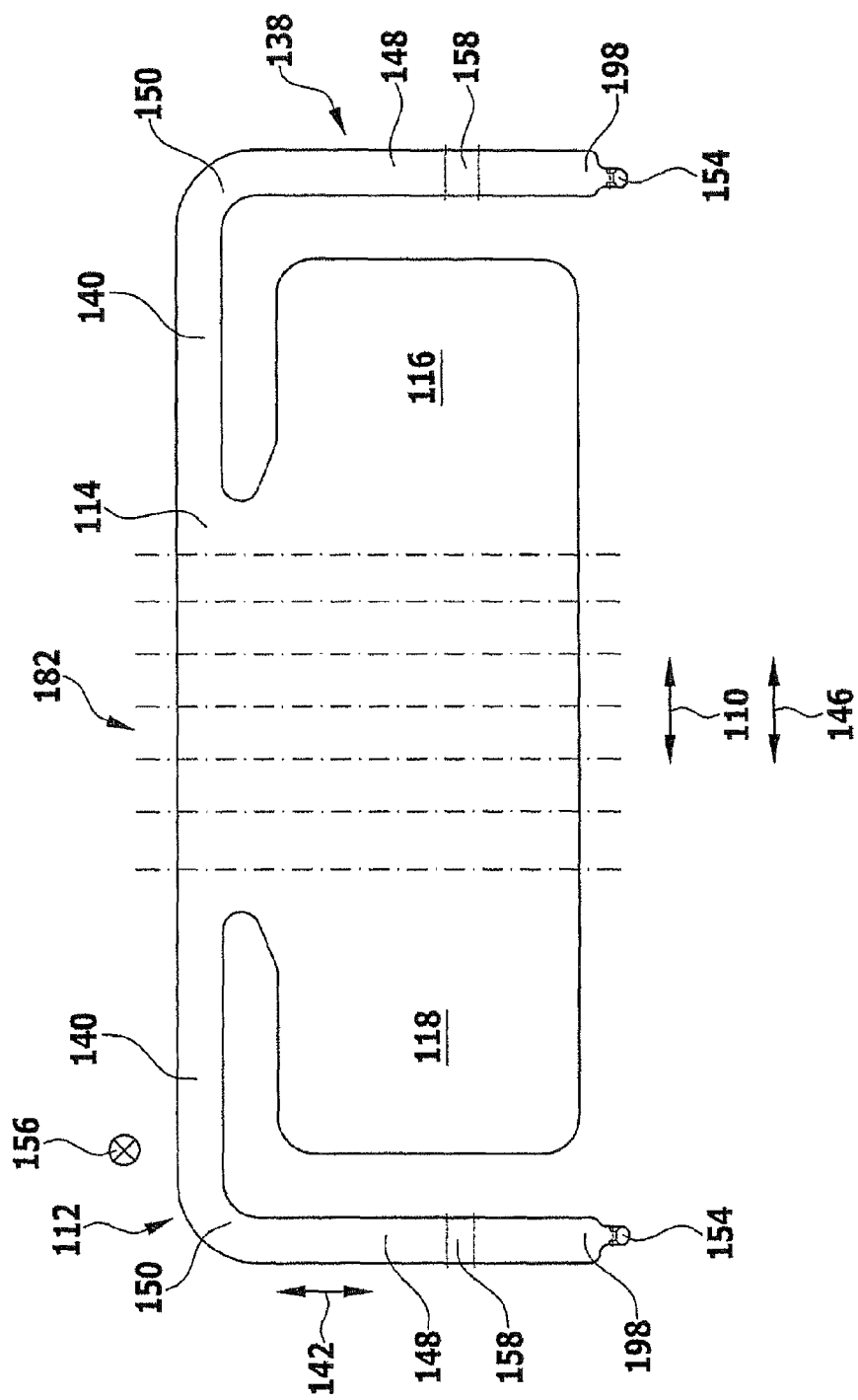
FIG. 7 shows a schematic plan view from above of the cell connector depicted in FIG. 6.

As can best be seen from the cross section depicted in FIG. 5, the contact element 154 in this embodiment is substantially in the form of a cylindrical section which extends about the longitudinal axis 200 of the contact element 154 over a peripheral angular extent α of more than 270°, preferably of more than 300°, of approximately 320° for example.

The contact element 154 thus comprises a peripheral wall 202 which extends around the longitudinal axis 200 and likewise extends over a peripheral angular extent α of more than 270°, preferably of more than 300°, of approximately 320° for example, about the longitudinal axis 200 and is provided substantially in its entirety with the coating 194 consisting of the contacting material.

By contrast, the two end faces 204 of the contact element 154, which are oriented radially relative to the longitudinal axis 200 and connect the outer surface of the contact element 154 to the inner surface of the contact element 154 close to the longitudinal axis 200 and which are spaced from one another by an angle β (β=360°−α) (taken with respect to the longitudinal axis 200), are not provided with the coating 194 of contacting material.

These two end faces 204 may, in particular, be free separation edges of the base body 114 which result from the process of separating the base body 114 from a pre-coated starting material (in particular, by being punched out or cut out) as will be explained in yet more detail hereinafter in the course of the explanation of the production of the base body 114.

Thus, in this embodiment of a cell connector 112, the contact element 154 is in the form of a virtually cylindrical spigot or pin 206 which is provided with the contacting material over substantially the whole of its peripheral wall 202 and is therefore solderable to a terminal element 188 of a voltage tapping line over its entire periphery.

As is illustrated in FIG. 4, in the assembled state of the cell connector 112, the pin-shaped contact element 154 extends through a passage opening 208 in the printed circuit board 190 which forms the terminal element 188 in this embodiment.

The passage opening 208 has an axial direction 209 which is substantially coaxial with the longitudinal axis 200 of the contact element 154 in the assembled state of the cell connector 112.

The contact element 154 is soldered to the terminal element 188 by means of a solder layer 210 which connects the edge of the passage opening 208 to the peripheral wall 202 of the contact element 154.

A secure, highly-conductive electrical connection between the contact element 154 on the one hand and the terminal element 188 on the other is thereby produced.

Consequently, by means of the contact element 154, one can obtain a reliable, operationally secure electrical connection of low contact resistance between the respectively associated contact region 116 and 118 of the cell connector 112 and the terminal element 188 of the voltage tapping line which is connected to a (not illustrated) evaluating device of the electro-chemical device 100.

Monitoring of the individual cells of the electro-chemical device 100 can be effected by means of the evaluating device by measuring differences in the electrical potential between the contact regions 116, 118 of the various cell connectors.

The electrical potential at the contact regions 116, 118 of the cell connector can thereby be detected and evaluated in a particularly simple manner.

For the purposes of producing the cell connector 112 such as the one illustrated in FIGS. 1 to 5, one proceeds as follows.

Firstly, there is provided a starting material made of a sheet-like starting material for example which comprises a base material that is provided with a coating of contacting material and consists of aluminum or an aluminum alloy for example.

Thereafter, a base body pre-form is separated out from the coated starting material by punching it out for example or by cutting it out (by means of a laser for example).

The wave peaks 184 and the wave troughs 186 of the compensation region 182 and the off-set portions 158 of the voltage tapping points 138 are formed in the base body pre-form by suitable reshaping processes, in particular, by stamping or deep-drawing processes.

A substantially rectangular extent section of the base body pre-form, which is connected in one piece manner by the narrower web member 196 to the end section 148 of the voltage tapping point 138, is formed by a rolling process into the virtually cylindrical contact element 154 having the longitudinal axis 200.

Subsequently, the web member 196 is bent in such a manner that the longitudinal axis 200 of the contact element 154 is aligned substantially in parallel with the contact direction 156 of the cell connector 112.

The production of the base body 114 of the cell connector 112 is thus concluded.

The contact body 120 is likewise separated out, separately from the base body 114, from a starting material consisting of a sheet-like starting material for example, by being punched out for example or by being cut out (by means of a laser for example).

Thereafter, the contact body 120 is connected to the base body 114, preferably by means of a substance-to-substance bond.

This connection is preferably effected by an ultrasonic welding process.

The cell connector 112 produced from the base body 114 and the contact body 120 in such a manner is then connected, at the contact body 120 and at the second contact region 118, to a respective cell terminal 108 of an electro-chemical cell 102, preferably, by means of a substance-to-substance bond.

Finally, the contact element 154 of the voltage tapping point 138 of the base body 114 is connected, in particular by soldering, to the terminal element 188 of the voltage tapping line which leads to the evaluating device of the electro-chemical device 100.

Figure 8:
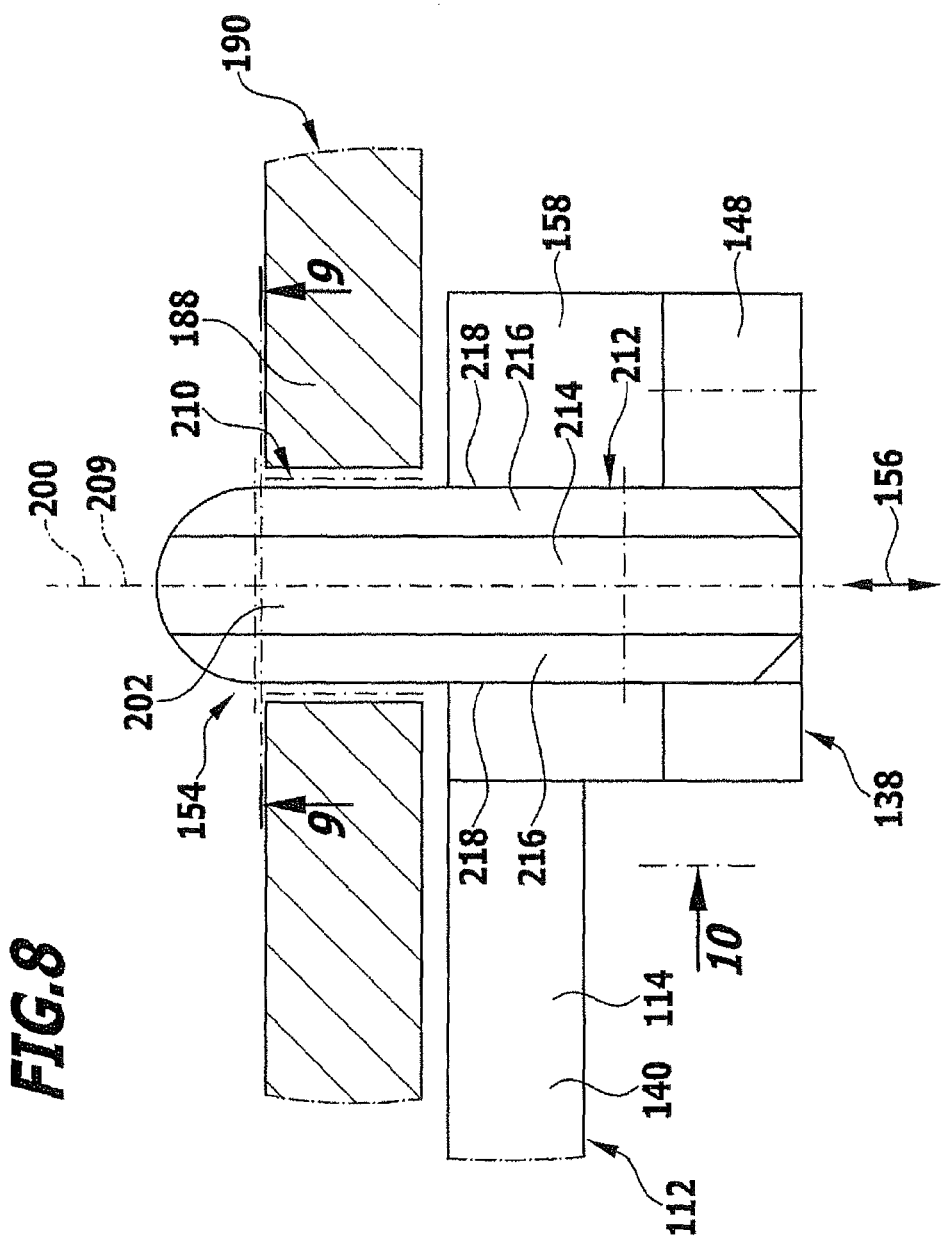
FIG. 8 shows an enlarged, partially sectional illustration of the region II depicted in FIG. 6.
Figure 9:
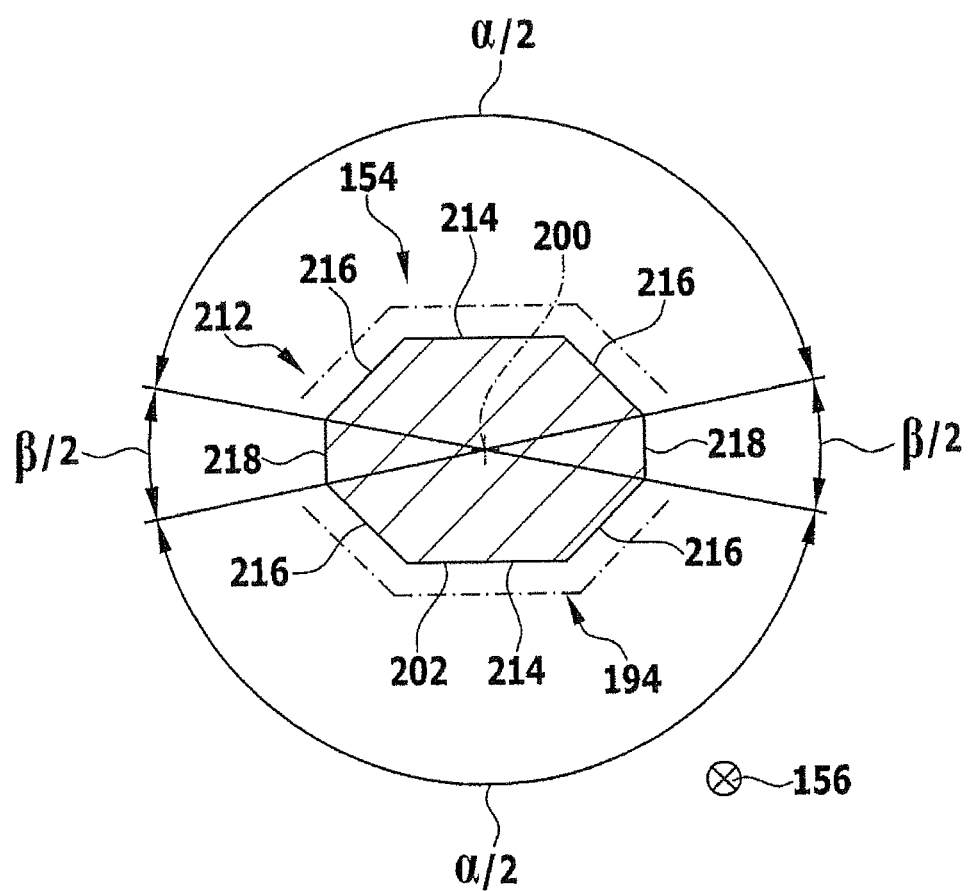
FIG. 9 shows a schematic cross section through the contact element of the cell connector, along the line 9-9 in FIG. 8.

A second embodiment of a cell connector 112 that is illustrated in FIGS. 6 to 10 differs from the previously described first embodiment that is illustrated in FIGS. 1 to 5 in that the contact element 154 of the voltage tapping point 138 is not in the form of a rolled, virtually cylindrical pin 206, but rather, is in the form of a stamped pin 212 having a polygonal cross section and in particular, an octagonal cross section (see in particular FIG. 9).

Figure 10:
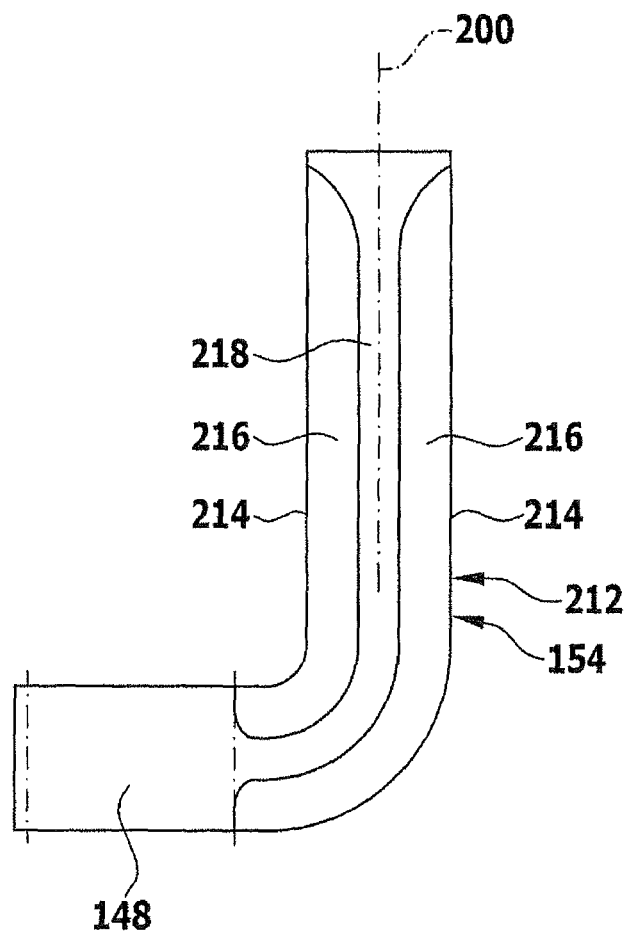
FIG. 10 shows a schematic side view of the contact element depicted in FIG. 8, along the line of sight denoted by the direction of the arrow 10 in FIG. 8.

As can best be seen from FIGS. 8 to 10, the pin 212 comprises two main side faces 214 which are parallel to the longitudinal axis 200 of the pin 212 and substantially parallel to each other and which are provided with the coating 194 of contacting material over substantially the whole of their surface areas.

Adjoined laterally to each of the main side faces 214, there are two beveled surfaces 216 which are likewise parallel to the longitudinal axis 200 of the contact element 154 and are inclined at an acute angle of e.g. approximately 45° to the respectively associated main side faces 214.

The beveled surfaces 216 of the contact element 154 are also provided with the coating 194 of contacting material over substantially the whole of their surface areas.

The free lateral edges of the beveled surfaces 216 remote from the main side faces 214 are connected to the respectively opposite further beveled surface 216 by a respective secondary side face 218 of the contact element 154 which is oriented such as to be parallel to the longitudinal axis 200 of the contact element 154 and, for example, substantially perpendicular with respect to the main side faces 214 of the contact element 154.

The adjoining side faces 218 are not provided with the coating 194 of contacting material.

The adjoining side faces 218 can, in particular, form free separation edges of the base body 114 of the cell connector 112.

As can best be seen from the cross section through the contact element 154 depicted in FIG. 9, the main side faces 214 and the beveled surfaces 216 of the contact element 154 form a coated part of a peripheral wall 202 of the contact element 154 which extends (in two mutually separated sections) over an overall peripheral angular extent α of more than 270°, preferably of more than 300°, of approximately 320° for example, about the longitudinal axis 200 and is provided with the coating 194 of contacting material over substantially the whole of its surface area.

The uncoated secondary side faces 218 of the contacting element together extend over a peripheral angle β (β= 360°−α) about the longitudinal axis 200 of the contact element 154 and form an uncoated part of the peripheral wall 202 of the contact element 154.

For the purposes of producing the cell connector 112 in accordance with the second embodiment, there is used a starting material which comprises a base, material, in particular, aluminum or an aluminum alloy and which is provided on both sides, i.e. on its upper surface and on its lower surface, with a coating 194 of contacting material.

After separating out the base body pre-form from the starting material having a coating on both sides, the coating 194 of contacting material initially extends over only the upper surface and the lower surface of the contact element pre-form and thus, only over a peripheral angular extent of 180° overall. Thereafter, the coated beveled surfaces 216 of the contact element 154 are produced from regions of the coated upper surface and the coated lower surface of the base body pre-form by a stamping process. Consequently, by virtue of the process of stamping these beveled surfaces 216, the peripheral angular extent of the part of the peripheral wall 202 of the contact element 154 that is provided with the coating 194 of contacting material is increased from 180° to at least 270°, preferably to at least 300°, whilst the peripheral angular extent of the uncoated part of the peripheral wall 202 is reduced correspondingly.

Hereby, the solderable upper surface of the contact element 154 is enlarged to such an extent as to enable a secure and electrically highly-conductive solder joint to be made to the terminal element 188 of the printed circuit board 190.

After the process of stamping the beveled surfaces 216, the end region of the contact element 154 facing the end section 148 of the voltage tapping point 138 is bent in such a way that the longitudinal axis 200 of the end region of the contact element 154 remote from the end section 148 of the voltage tapping point 138 is aligned such as to be substantially parallel to the contact direction 156 of the cell connector 112.

In the process of assembling the cell connector 112, the pin shaped contact element 154 is inserted into the passage opening 208 of the terminal element 188 and then soldered to the edge of the passage opening 208 by means of a layer of solder 210.

In all other respects, the second embodiment of a cell connector 112 that is illustrated in FIGS. 6 to 10 corresponds in regard to the construction, functioning and manner of manufacture thereof to the first embodiment that is illustrated in FIGS. 1 to 5, and insofar, reference is made to the preceding description thereof.

Figure 11:
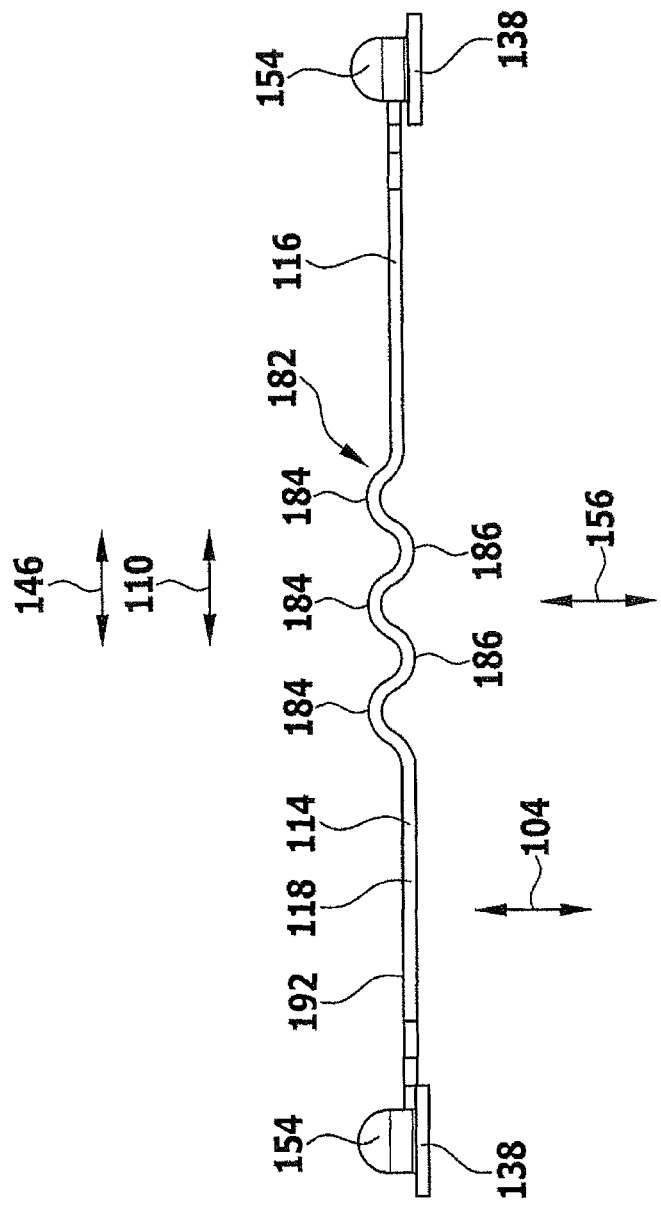
FIG. 11 shows a schematic side view of a third embodiment of a cell connector incorporating a contact element which is in the form of a deep-drawn bowl.
Figure 12:
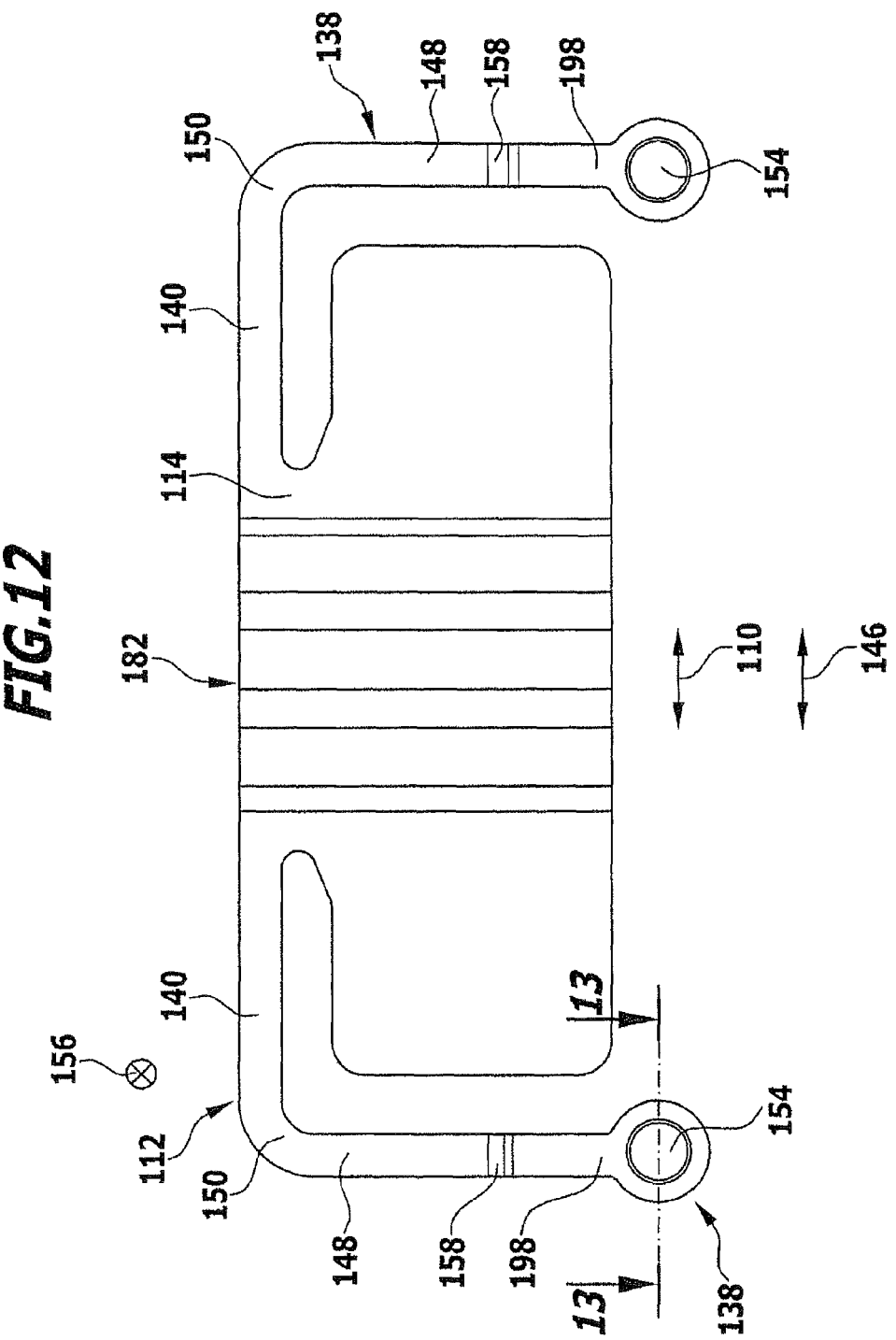
FIG. 12 shows a schematic plan view from above of the cell connector depicted in FIG. 11.
Figure 13:
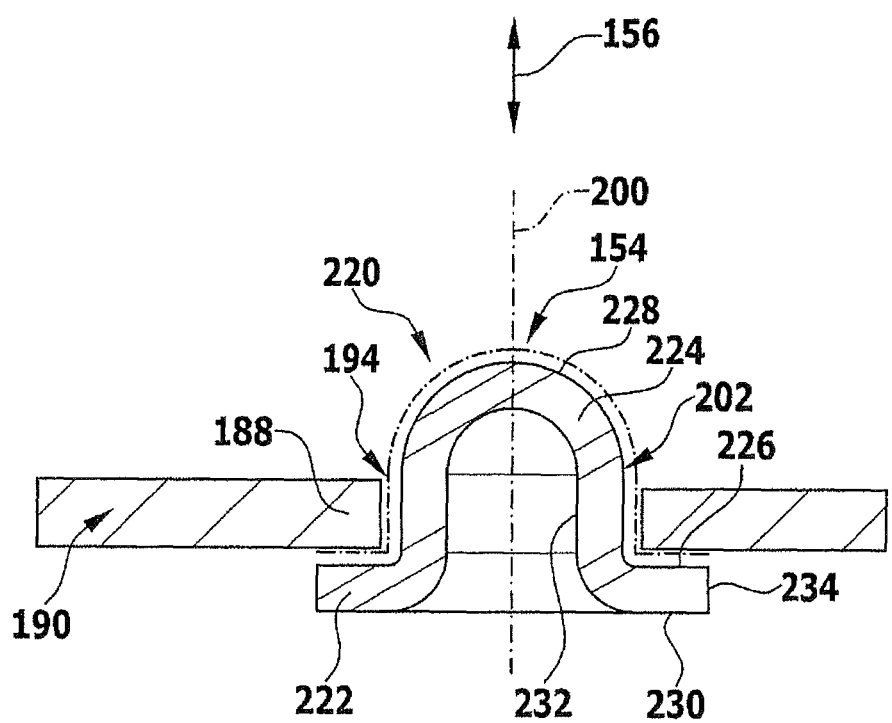
FIG. 13 shows a schematic vertical section through the contact element of the cell connector depicted in FIGS. 11 and 12, along the line 13-13 in FIG. 12.

A third embodiment of a cell connector 112 that is illustrated in FIGS. 11 to 13 differs from the two embodiments that are illustrated in FIGS. 1 to 10 in that the contact element 154 of the voltage tapping point 138 is not in the form of a rolled or stamped pin but rather, in the form of a deep-drawn bowl 220 having an annular flanged region 222 from which a dome-shaped region protrudes in the contact direction 156.

The flanged region 222 of the contact element 154 is connected to the end section 148 of the voltage tapping point 138 in one piece manner.

In this embodiment, the upper surface 226 of the flanged region 222 and the outer surface 228 of the dome-shaped region 224 of the contact element 154 are provided with the coating 194 of contacting material over substantially the whole of their surface areas, whilst the lower surface 230 of the flanged region 222, the inner surface 232 of the dome-shaped region 224 and the lateral edge 234 of the flanged region 222 are preferably uncoated.

Thus, in this embodiment, the outer surface 228 of the contact element 154 forms a peripheral wall 202 of the contact element 154 which extends over a peripheral angular extent of 360° about the longitudinal axis 200 of the contact element 154 and is provided with the coating 194 of contacting material over substantially all of its surface area.

The dome-shaped region 224 of the contact element 154 is preferably substantially rotationally symmetrical with respect to the longitudinal axis 200 in this embodiment.

For the purposes of producing the base body 114 of the cell connector 112 in this third embodiment, a starting material which is coated with the contacting material on only one side thereof is preferably used.

The base body pre-form is separated out from this starting material, by being punched out for example or by being cut out (by means of a laser for example) in such a manner that a contact element pre-form having the appearance of a substantially circular disk is obtained.

The bowl-like contact element 154 that is illustrated in FIG. 13 is formed from this disk-shaped contact element pre-form in a subsequent deep-drawing process.

In the process of assembling the cell connector 112, the contact element 154 is introduced into the passage opening 208 of the terminal element 188 with its coated outer surface foremost, and the outer surface 228 of the dome-shaped region 224 of the contact element 154 that is coated with the contacting material is connected by a layer of solder to the edge of the passage opening 208 in order to produce the electrically conductive connection between the contact element 154 and the terminal element 188.

In all other respects, the third embodiment of a cell connector 112 that is illustrated in FIGS. 11 to 13 corresponds in regard to the construction, functioning and manner of manufacture thereof to the first embodiment that is illustrated in FIGS. 1 to 5, and insofar, reference is made to the preceding description thereof.

Figure 14:
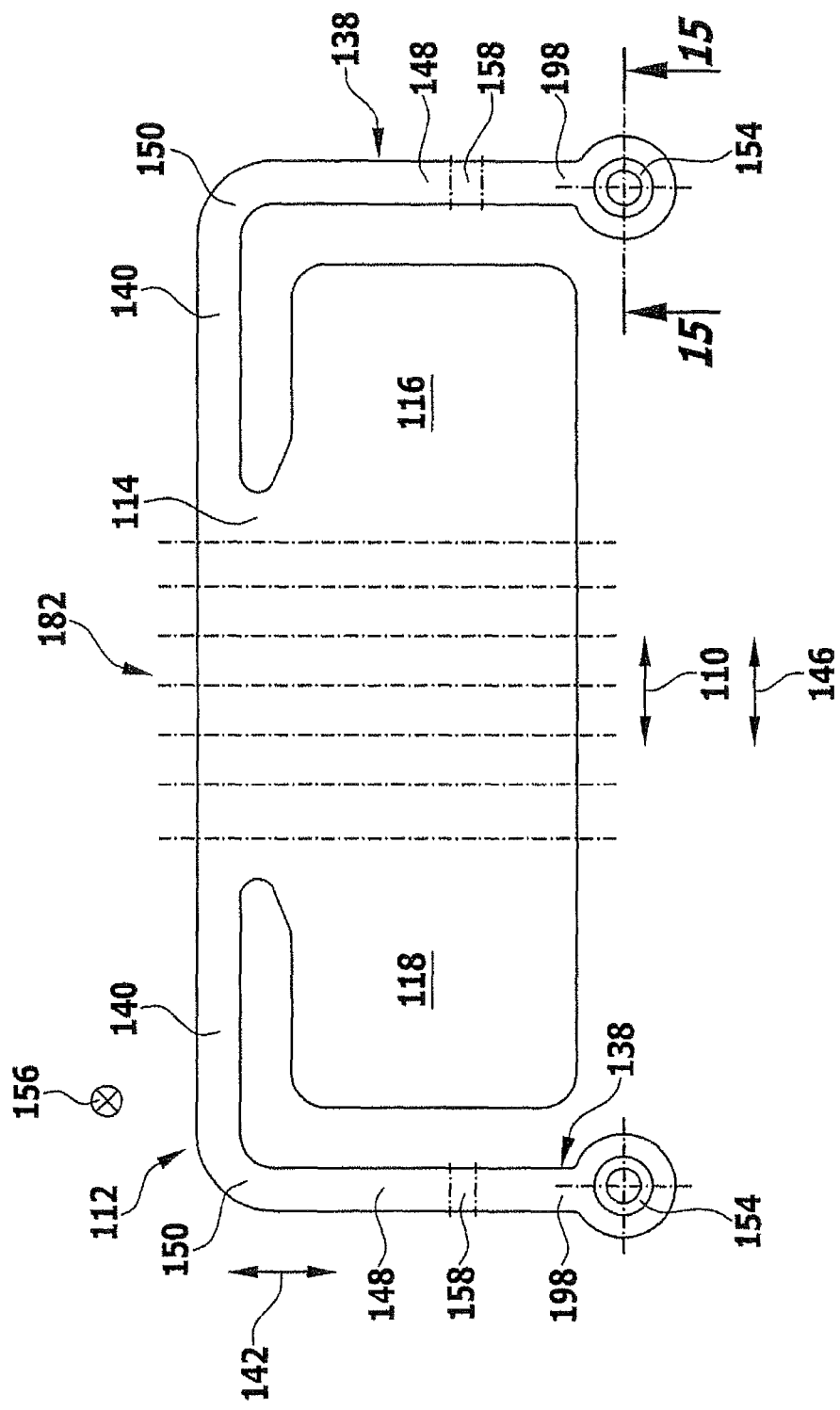
FIG. 14 shows a schematic plan view from above of a fourth embodiment of a cell connector incorporating a contact element which is in the form of a deep-drawn sleeve.
Figure 15:
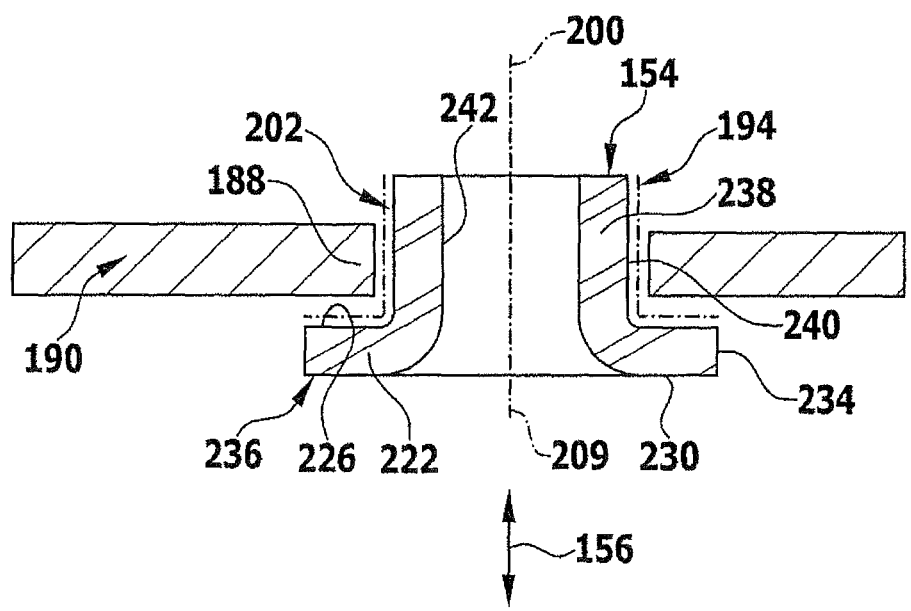
FIG. 15 shows a schematic vertical section through the contact element of the cell connector depicted in FIG. 14, along the line 15-15 in FIG. 14.

A fourth embodiment of a cell connector 112 that is illustrated in FIGS. 14 and 15 differs from the third embodiment that is illustrated in FIGS. 11 to 13 in that the contact element 154 of the voltage tapping point 138 is not in the form of a bowl 220 having a closed dome-shaped region 224, but instead, it is in the form of a sleeve 236 which is open at both ends.

The sleeve 236 comprises an annular flanged region 222 from which a substantially hollow cylindrical region 238 of the contact element 154 protrudes in the contact direction 156.

The upper surface 226 of the flanged region 222 and the outer surface 240 of the hollow cylindrical region 238 are provided with the coating 194 of contact material.

The outer surface 240 of the hollow cylindrical region 238 thus forms a peripheral wall 202 of the contact element 154 which extends over a peripheral angular extent of 360° about the longitudinal axis 200 of the contact element 154 and substantially the whole surface area thereof is provided with the coating 194 of contacting material.

In this embodiment however, the lower surface 230 of the flanged region 222, the inner surface 242 of the hollow cylindrical region 238 and the lateral edge 234 of the flanged region 222 are preferably not provided with the coating 194 of contacting material.

For the purposes of producing the base body 114 of the cell connector 112 in accordance with this fourth embodiment, use is made of a starting material that is coated with the contacting material on only one side thereof.

The base body pre-form that has been separated out from this starting material, by being punched out or cut out for example, comprises an e.g. circular-disk-shaped contact element pre-form into which a passage opening has been introduced, preferably, substantially centrally thereof.

Subsequently, the sleeve-shaped contact element 154 which is illustrated in FIG. 15 is produced from the contact element pre-form provided with the passage opening by a deep-drawing process.

Thus, in this embodiment, the contact element 154 has the shape of an eyelet or a soldering land.

In the process of assembling the cell connector 112, the contact element 154 is introduced into the passage opening 208 of the terminal element 188 with the hollow cylindrical region 238 thereof foremost, and the outer surface 240 of the hollow cylindrical region 238 provided with the coating 194 of contacting material is connected by a layer of solder to the edge of the passage opening 208 so as to produce a mechanically sound and highly conductive electrical connection between the contact element 154 and the terminal element 188 of the voltage tapping line.

In all other respects, the fourth embodiment of a cell connector 112 that is illustrated in FIGS. 14 and 15 corresponds in regard to the construction, functioning and manner of manufacture thereof to the third embodiment that is illustrated in FIGS. 11 to 13, and insofar, reference is made to the preceding description thereof.

Figure 16:
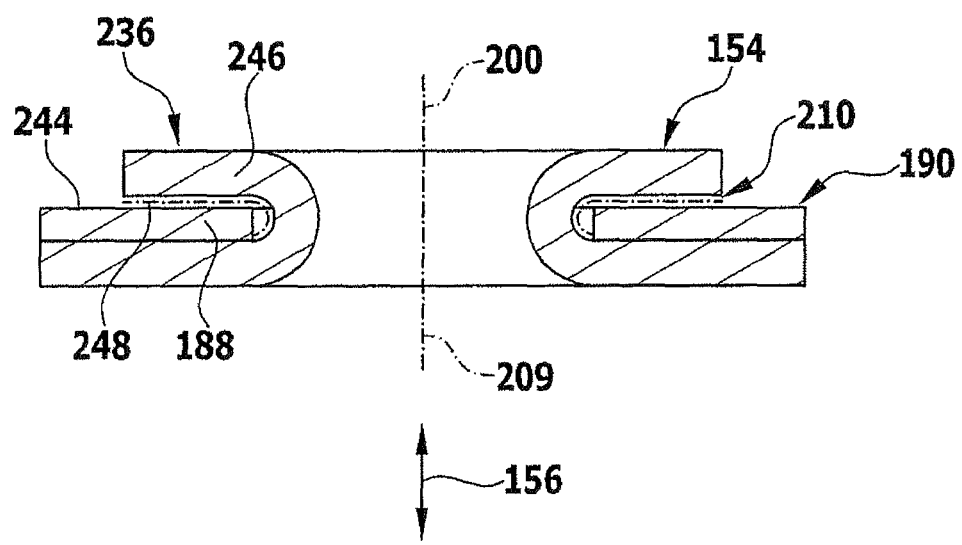
FIG. 16 shows a schematic section through a contact element which is in the form of a sleeve, and an associated terminal element of a voltage tapping line in a fifth embodiment of a cell connector.

A fifth embodiment of a cell connector 112 that is illustrated in FIG. 16 differs from the previously described fourth embodiment that is illustrated in FIGS. 14 and 15 in that, after the introduction of the contact element 154 into the passage opening 208 of the terminal element 188 of the voltage tapping line during the process of assembling the cell connector 112, the contact element 154 of the voltage tapping point 138 that was initially produced in the form of a sleeve 236 has been deformed in such a manner that the initially hollow cylindrical region 238 of the contact element 154 has been splayed radially outwardly onto an upper surface 244 of the terminal element 188 so that, in its fully assembled state, the contact element 154 comprises a connecting rim 246 by means of which the contact element 154 is fixed to the terminal element 188 and thus to the printed circuit board 190 not only by virtue of a substance-to-substance bond, but also in interlocking manner.

In this embodiment, the contact element 154 and the terminal element 188 are connected together using a substance-to-substance bond and in electrically conductive manner by means of a solder layer 210 which is arranged between a lower surface 248 of the connecting rim 246 and the upper surface 244 of the terminal element 188.

In all other respects, the fifth embodiment of a cell connector 112 that is illustrated in FIG. 16 corresponds in regard to the construction, functioning and manner of manufacture thereof to the fourth embodiment that is illustrated in FIGS. 14 and 15, and insofar, reference is made to the preceding description thereof.

Figure 17:
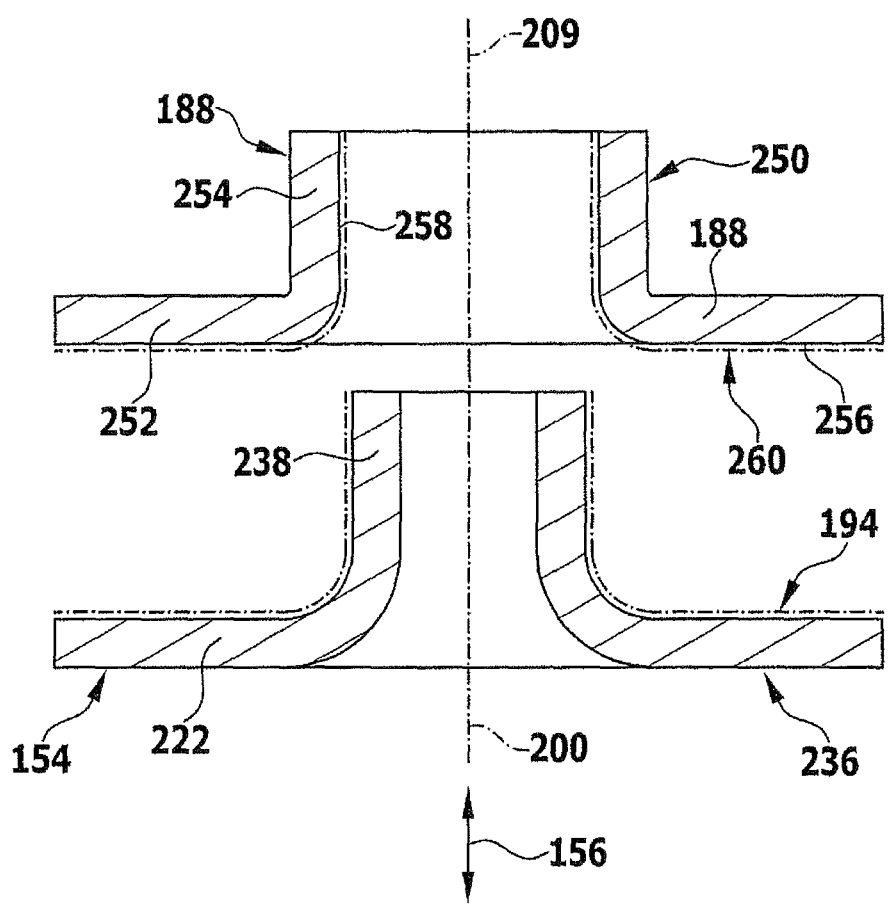
FIG. 17 shows a schematic section through a contact element which is in the form of a sleeve, and a terminal element of a voltage tapping line which is likewise in the form of sleeve in an unconnected state of the contact element and the terminal element, in a sixth embodiment of a cell connector.
Figure 18:
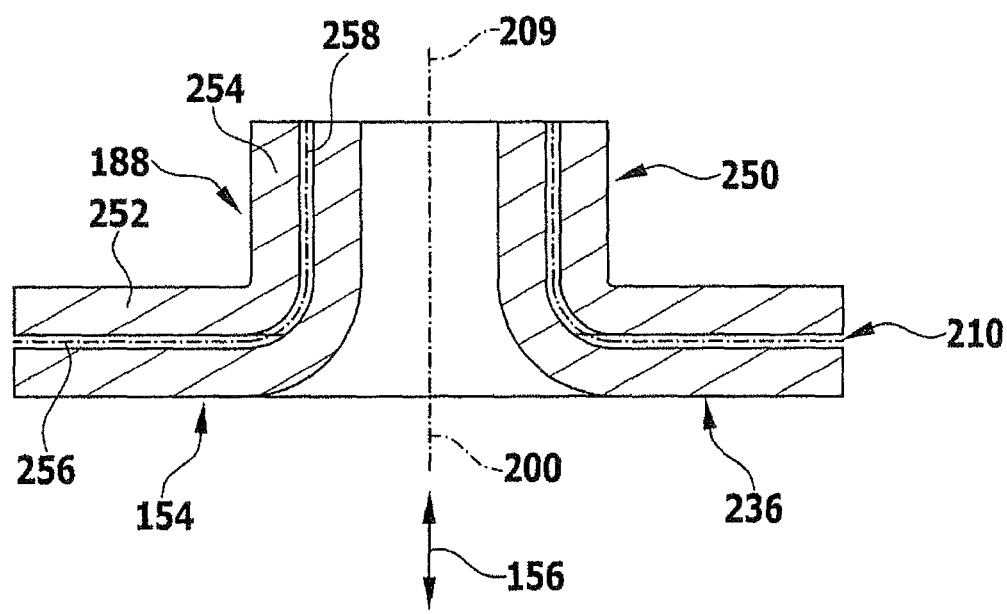
FIG. 18 shows a schematic section through the contact element and the terminal element depicted in FIG. 17 in the connected state of the contact element and the terminal element.

A sixth embodiment of a cell connector 112 that is illustrated in FIGS. 17 and 18 differs from the fourth embodiment that is illustrated in FIGS. 14 and 15 in that the terminal element 188 of the voltage tapping line in this embodiment is not merely in the form of a passage opening 208 in the printed circuit board 190, but instead, it is in the form of a sleeve 250 having a flanged region 252 and a hollow cylindrical region 254.

In connection therewith, the internal diameter of the hollow cylindrical region 254 of the terminal element 188 is somewhat greater than the external diameter of the hollow cylindrical region 238 of the contact element 154 so that the hollow cylindrical region 238 of the contact element 154 can be inserted substantially completely into the terminal element 188, as is illustrated in FIG. 18.

In the process of assembling the cell connector 112, the contact element 154 and the sleeve-shaped terminal element 188 are connected together by a solder layer 210 which is arranged between the upper surface 226 of the flanged region 222 and the outer surface 240 of the hollow cylindrical region 238 of the contact element 154 on the one hand and a lower surface 256 of the flanged region 252 and an inner surface 258 of the hollow cylindrical region 254 of the terminal element 188 on the other.

In order to facilitate the process of soldering the contact element 154 and the terminal element 188, provision may also be made for the lower surface 256 of the flanged region 252 and the inner surface 258 of the hollow cylindrical region 254 of the terminal element 188 to be provided with a coating 260 consisting of a contacting material.

This contacting material may be the same as the material of the coating 194 of the contact element 154 or it could be different from this material.

In all other respects, the sixth embodiment of a cell connector 112 that is illustrated in FIGS. 17 and 18 corresponds to the fourth embodiment that is illustrated in FIGS. 14 and 15 in regard to the construction, functioning and manner of manufacture thereof, and insofar, reference is made to the preceding description thereof.

Figure 19:
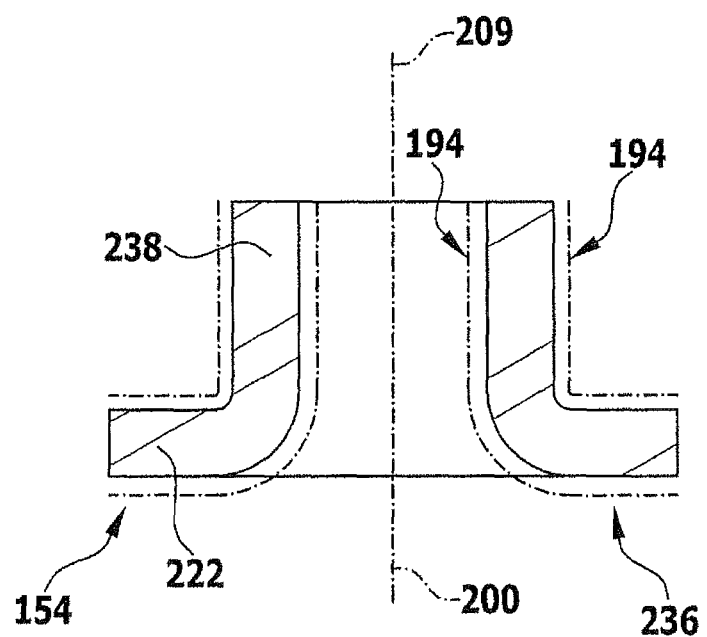
FIG. 19 shows a schematic section through a contact element which is in the form of a sleeve in a seventh embodiment of a cell connector.

A seventh embodiment of a cell connector 112 that is illustrated in FIG. 19 differs from the embodiments that are illustrated in FIGS. 14, 15, 17 and 18 in that the sleeve-shaped contact element 154 is not only provided with the coating 194 of contacting material on the outer surface 240 of the hollow cylindrical region 238 and on the upper surface 226 of the flanged region 222, but in addition, this coating is also provided on the inner surface 242 of the hollow cylindrical region 238 and on the lower surface 230 of the flanged region.

This is achieved in that, for the purposes of producing the base body 114 of the cell connector 112, there is used a starting material wherein the base material thereof is provided with a coating 194 of contacting material on both its upper surface and on its lower surface.

This embodiment of the contact element 154 offers the advantage that the contact element can be soldered to an appropriate terminal element 188 on both the outer surface and the inner surface thereof.

In connection therewith, the terminal element 188 that is to be connected mechanically and in electrically conductive manner to the contact element 154 can be in the form of a passage opening 208 in the printed circuit board or in the form of a sleeve 250 for example.

In all other respects, the seventh embodiment of a cell connector 112 that is illustrated in FIG. 19 corresponds in regard to the construction, functioning and manner of manufacture thereof to the fourth embodiment that is illustrated in FIGS. 14 and 15, and insofar, reference is made to the preceding description thereof.

The invention claimed is:

1. A cell connector for an electrically conductive connection of a first cell terminal of a first electro-chemical cell and a second cell terminal of a second electro-chemical cell, comprising a voltage tapping point with a contact element for an electrically conductive connection to a terminal element of a voltage tapping line, wherein the contact element comprises a longitudinal axis and a peripheral wall extending around the longitudinal axis, wherein the contact element comprises a base material which is at least partially pre-coated with a contacting material in an initial state and is reshaped from the initial state into a final state in such a manner that the proportion of a part of the peripheral wall that is coated with the contacting material to an overall peripheral angular extent of the peripheral wall amounts to more than 50%, wherein the contact element is in the form of a sleeve which is coated with the contacting material on the inner periphery thereof and/or on the outer periphery thereof, and wherein the contact element has two end faces which connect the outer periphery of the contact element to the inner periphery of the contact element and which are not coated with the coating material.

2. The cell connector in accordance with claim 1, wherein the peripheral wall of the contact element is coated with the contacting material over a peripheral angular extent (a) of at least approximately 270° in the final state.

3. The cell connector in accordance with claim 1, wherein the contact element is reshaped by a rolling process.

4. The cell connector in accordance with claim 1, wherein the contact element is reshaped by a deep-drawing process.

5. The cell connector in accordance with claim 1, wherein the contact element is reshaped by a stamping process.

6. The cell connector in accordance with claim 1, wherein the base material comprises aluminum.

7. The cell connector in accordance with claim 1, wherein the contacting material comprises nickel, silver, gold, copper and/or tin.

8. The cell connector in accordance with claim 1, wherein the contact element comprises at least one free separation edge which is not coated with the contacting material.

9. The cell connector in accordance with claim 1, wherein the peripheral wall of the contact element is coated with the contacting material to at least 50% in the final state.

10. A combination of
a cell connector for an electrically conductive connection of a first cell terminal of a first electro-chemical cell and a second cell terminal of a second electro-chemical cell, and
a terminal element of a voltage tapping line of an electro-chemical device,
the cell connector comprising a voltage tapping point with a contact element for an electrically conductive connection to the terminal element, wherein the contact element comprises a longitudinal axis and a peripheral wall extending around the longitudinal axis, wherein the contact element comprises a base material which is at least partially pre-coated with a contacting material in an initial state and is reshaped from the initial state into a final state in such a manner that the proportion of a part of the peripheral wall that is coated with the contacting material to an overall peripheral angular extent of the peripheral wall amounts to more than 50%, wherein the contact element of the cell connector is connected to the terminal element by means of a substance-to-substance bond, wherein the contact element is in the form of a sleeve which is coated with the coating material on the inner periphery thereof and/or on the outer periphery thereof; and wherein the contact element has two end faces which connect the outer periphery of the contact element to the inner periphery of the contact element and which are not coated with the coating material.

11. The combination in accordance with claim 10, wherein the contact element is soldered to the terminal element.

12. The combination in accordance with claim 10, wherein the terminal element comprises a passage opening with an axial direction, wherein the longitudinal axis of the contact element is coaxial with the axial direction of the passage opening.

13. A method of manufacturing a cell connector for an electrically conductive connection of a first cell terminal of a first electro-chemical cell and a second cell terminal of a second electro-chemical cell, wherein the cell connector comprises a voltage tapping point with a contact element for an electrically conductive connection to a terminal element of a voltage tapping line, comprising the following processing steps:
providing a base material which is at least partially pre-coated with a contacting material;
separating out a cell connector pre-form from the pre-coated base material; and
reshaping the cell connector pre-form in such a manner that there is formed the contact element which, in an end state after the reshaping process, has a longitudinal axis and a peripheral wall extending over a peripheral angular extent about the longitudinal axis, wherein the proportion of a part of the peripheral wall that is coated with the contacting material to an overall peripheral angular extent of the peripheral wall amounts to more than 50% in the end state.

* * * * *